United States Patent
Manders (12)

(10) Patent No.: US 6,419,310 B1
(45) Date of Patent: Jul. 16, 2002

(54) OPEN ROOF CONSTRUCTION FOR A VEHICLE

(75) Inventor: Peter Christiaan Leonardus Johannes Manders, Horst (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/661,231

(22) Filed: Sep. 13, 2000

(30) Foreign Application Priority Data

Sep. 15, 1999 (NL) .............................................. 1013053

(51) Int. Cl.$^7$ ............................. B60J 7/05; B60J 7/057; B60J 7/19

(52) U.S. Cl. ........................ 296/223; 296/221; 296/224

(58) Field of Search ................................. 296/221–224

(56) References Cited

U.S. PATENT DOCUMENTS

| | | | |
|---|---|---|---|
| 4,417,763 A | 11/1983 | Schlapp et al. ............. | 296/216 |
| 4,619,480 A | 10/1986 | Motoyama et al. ......... | 296/217 |
| 4,647,104 A | 3/1987 | Kohlpaintner et al. ...... | 296/221 |
| 4,684,169 A | 8/1987 | Igel et al. .................... | 296/221 |
| 4,725,092 A | 2/1988 | Reintges et al. ............ | 296/221 |
| 4,752,099 A | 6/1988 | Roos et al. .................. | 296/223 |
| 4,877,285 A | 10/1989 | Huyer ......................... | 296/216 |
| 5,020,849 A * | 6/1991 | Schlapp et al. ............. | 296/221 |
| 5,058,947 A | 10/1991 | Huyer ......................... | 296/216 |
| 5,066,068 A | 11/1991 | Suzuki et al. ............... | 296/221 |
| 5,259,662 A * | 11/1993 | Huyer ......................... | 296/221 |
| 5,527,085 A | 6/1996 | Ochiai et al. ............... | 296/223 |
| 5,593,204 A | 1/1997 | Wahl et al. .................. | 296/223 |
| 5,845,959 A | 12/1998 | Ueki ........................... | 296/221 |
| 6,164,128 A | 12/2000 | Stallfort ...................... | 296/222 |

FOREIGN PATENT DOCUMENTS

| | | |
|---|---|---|
| DE | 3442600 | 5/1986 |
| DE | 3603314 A1 | 6/1987 |
| DE | 3930756 | 3/1991 |
| DE | 9116412 | 2/1993 |
| DE | 4 405 742 | 5/1995 |
| EP | 0 033 816 | 8/1981 |

(List continued on next page.)

OTHER PUBLICATIONS

U.S. application No. 09/553,689, filed Apr. 21, 2000.
U.S. application No. 09/556,192, filed Apr. 21, 2000.
U.S. application No. 09/556,110, filed Apr. 21, 2000.
U.S. application No. 09/530,004, filed Apr. 21, 2000.
U.S. application No. 09/616,168, filed Jul. 14, 2000.
U.S. application No. 09/616,172, filed Jul. 14, 2000.
U.S. application No. 09/616,559, filed Jul. 14, 2000.
"The Woodworkers'Store", 1993–94 Catalog.

Primary Examiner—Dennis H. Pedder
(74) Attorney, Agent, or Firm—Westman, Champlin & Kelly, P.A.; S. Koehler

(57) ABSTRACT

An open roof construction for a vehicle having an opening in its fixed roof comprises a frame and an adjustable closure element. Said closure element is adjustable between a closed position, in which it closes the roof opening, and an open position, in which it releases the roof opening on the front side. The frame comprises at least one guide rail extending in the longitudinal direction of the vehicle. An operating mechanism for the closure element is provided for effecting a pivoting movement of the closure element and a movement of the closure element in the longitudinal direction of the guide rail. The operating mechanism includes an element which is at least substantially stationary during the pivoting movement of the closure element and which moves along with the movement of the closure element. A correction mechanism is provided for moving the closure element slightly in the longitudinal direction of the guide rail upon pivoting movement of said closure element about a pivot member. The correction mechanism includes an assembly consisting of single cam and two camways, only one of which is operative. The cam is connected with the panel and the camways are formed on said element of the operating mechanism.

9 Claims, 5 Drawing Sheets

FOREIGN PATENT DOCUMENTS

| | | |
|---|---|---|
| EP | 0 143 589 | 6/1985 |
| EP | 0 218 890 | 4/1987 |
| EP | 0 343 750 | 11/1989 |
| EP | 0 517 318 A1 | 12/1992 |
| EP | 0 747 249 | 2/1996 |
| EP | 195 14 585 | 10/1996 |
| EP | 0 899 140 | 3/1999 |
| FR | 2 495 068 | 6/1982 |
| FR | 2 527 995 A | 12/1983 |
| JP | 0278422 | 12/1986 |
| JP | 0104734 | 5/1991 |
| JP | 404297323 | 10/1992 |

\* cited by examiner

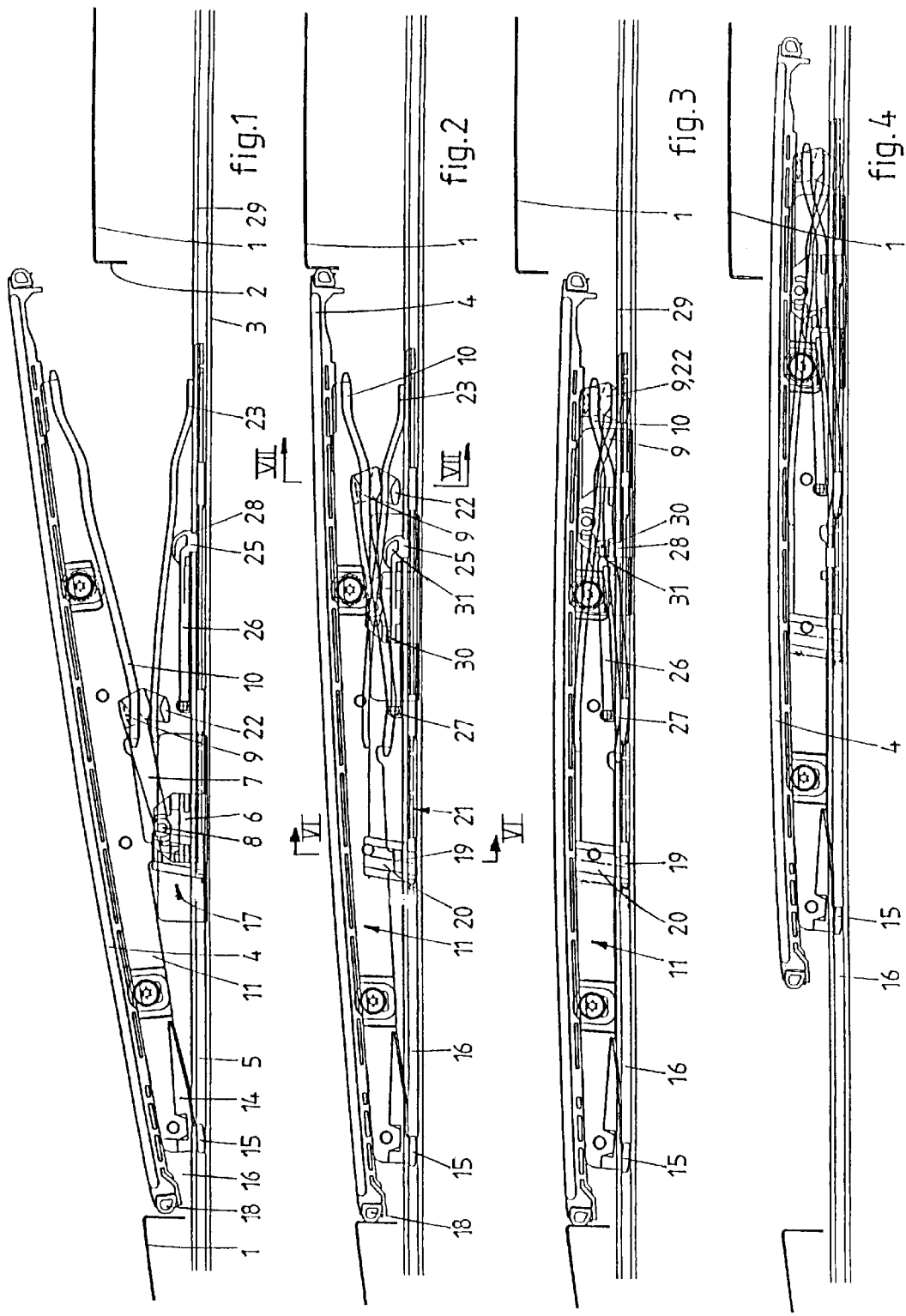

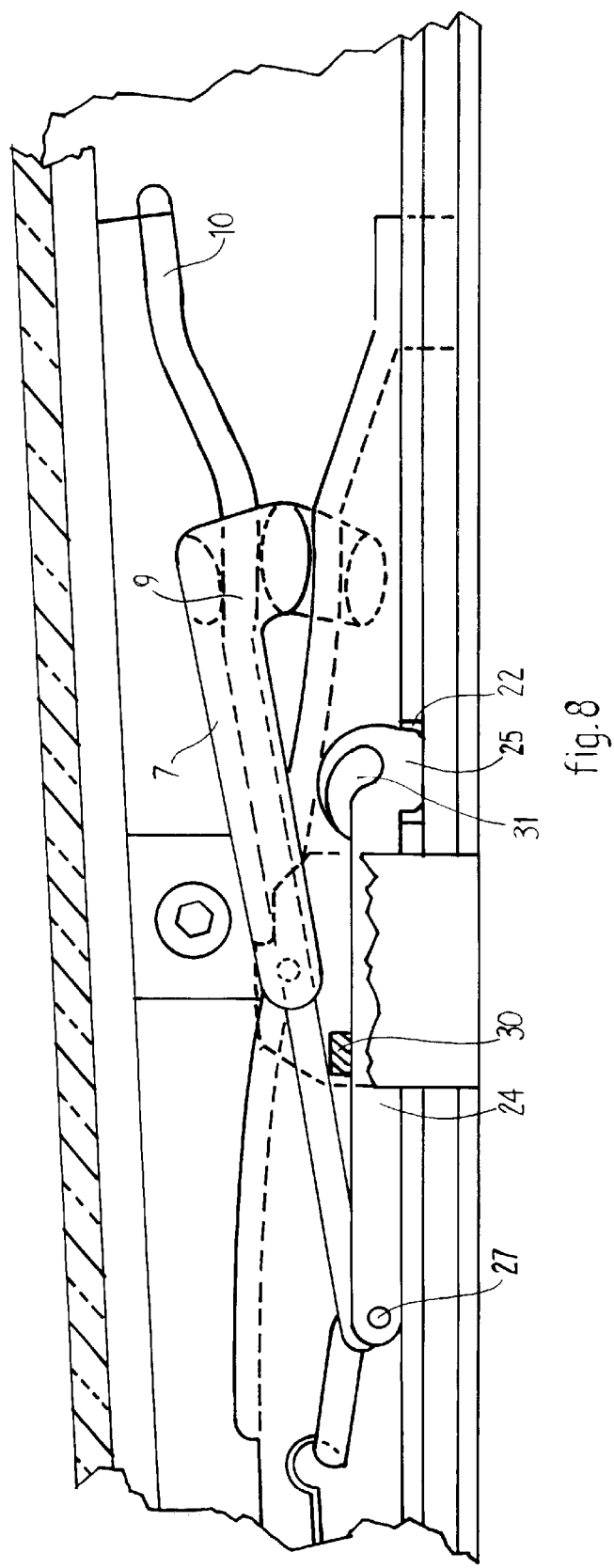

OPEN ROOF CONSTRUCTION FOR A VEHICLE

BACKGROUND OF THE INVENTION

The invention relates to an open roof construction for a vehicle.

In Dutch patent application No. 1011863 (EP 00201260.7) (not pre-published), from which the present invention departs, the element and the counter element consist of two cams formed on the panel and two camways formed on a link slide, respectively. Although the twin construction provides a solid structure, it has the drawback that if the two cams or camways are not properly aligned, the cams may jam in the camways, which may interfere with the smooth operation of the operating mechanism.

SUMMARY OF THE INVENTION

The object of the invention is to further improve the open roof construction of the kind referred to in the introduction.

By constructing either one of said element and said counter element as twin elements, parts such as the element of the operating mechanism can remain identical on the left and on the right, which simplifies production and inventory. Jamming problems are also avoided by using only one element or counter element for the correction mechanism, as a result of which the correction mechanism is less sensitive to production tolerances, while a smooth operation of the operating mechanism is nevertheless ensured.

In an advantageous embodiment said element comprises a cam, and said counter elements comprise camways, wherein said cam is preferably formed on the closure element and said camways are formed on the element in the form of a link slide.

In one embodiment, the invention is especially advantageous if the link slide is divided in longitudinal direction, being made of two interconnected halves. In a construction of this kind the camways may be shifted in a horizontal direction with respect to each other due to the fact that the two parts of the link slide are not entirely correctly aligned. Since the camways will generally exhibit a fairly steep slope, the cams may easily jam if two cams are used, which will result in variations in the required driving force, an increased noise level of the driving mechanism and a loss of "sense of quality" in the driving mechanism. This problem is avoided with the open roof construction according to the invention.

BRIEF DESCRIPTION OF THE DRAWINGS

The invention will now be explained in more detail with reference to the drawing, which shows an embodiment of the open roof construction according to the invention.

FIGS. 1–4 are longitudinal sectional views of the embodiment of the open roof construction according to the invention, showing four different positions thereof.

FIG. 8 is a larger-scale elevational view of FIG. 2

DETAILED DESCRIPTION OF THE ILLUSTRATIVE EMBODIMENT

Figure 5:
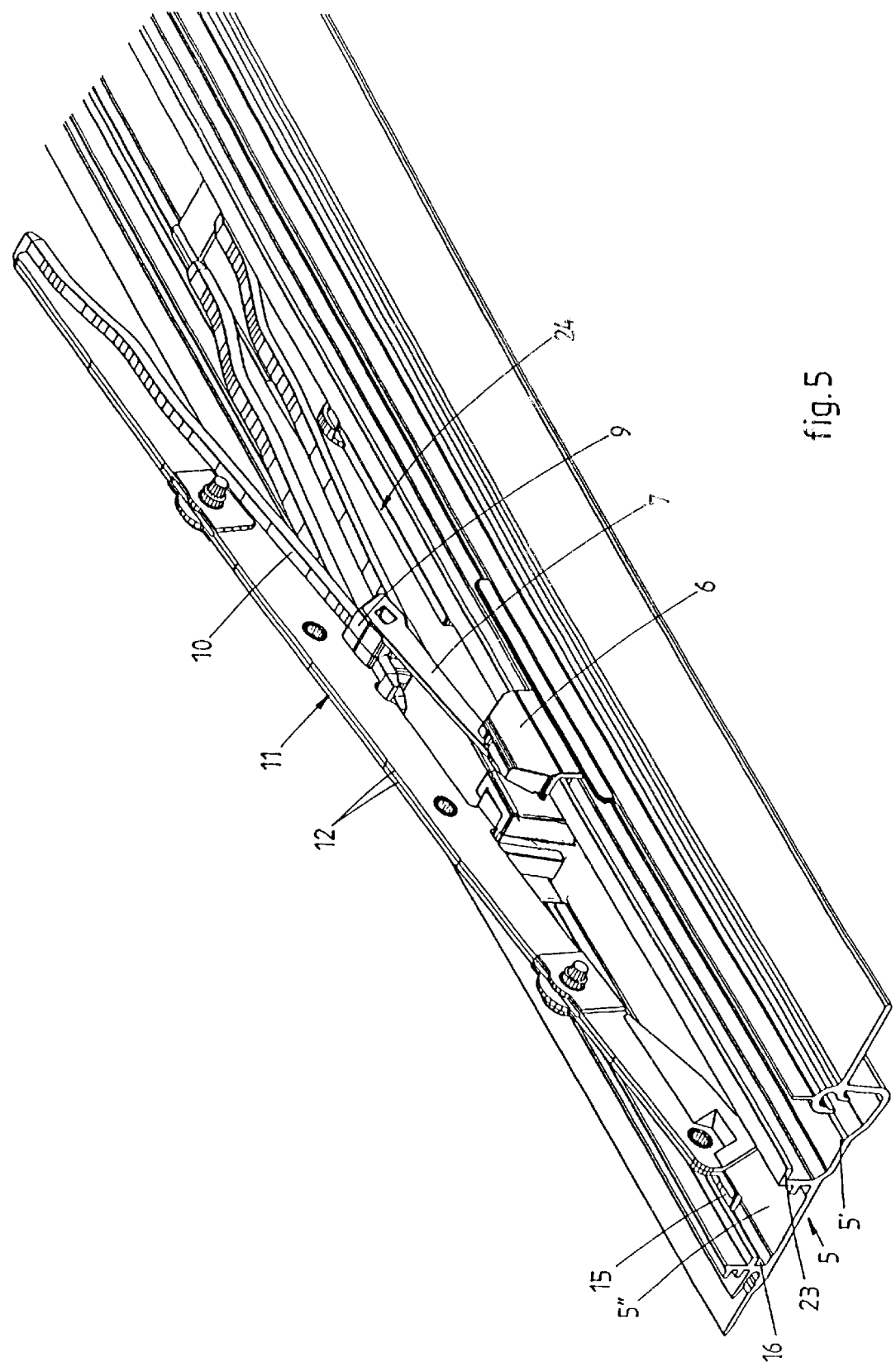
FIG. 5 is a perspective view of the main components of the operating mechanism of the open roof construction of FIGS. 1–4.

The drawings, and in the first instance FIGS. 1–4, show an exemplary embodiment of the open roof construction according to the invention, which is built into a vehicle, such as a passenger car, in whose fixed roof 1 a roof opening 2 is present. The open roof construction comprises a frame 3 or different stationary part, which can be attached to the fixed roof 1, or which is formed thereon. Said frame 3 supports, in a manner to be described in more detail hereafter, a closure element 4 which is capable of selectively closing the roof opening 2 or releasing it at least partially.

In the illustrated embodiment, the open roof construction is a so-called sliding-tilt roof, wherein the closure element 4 is in the form of a transparent, rigid panel, which can be moved from the closed position in roof opening 2 (FIG. 2), on the one hand to an upwardly sloping ventilating position (FIG. 1) and on the other hand downwards (FIG. 3) and subsequently rearwards to a position under the fixed roof 1 (FIG. 4).

In order to enable these movements, panel 4 is fitted with an operating mechanism at both longitudinal edges, one of which is shown in the drawings, whereby it should be considered, however, that the same operating mechanism is disposed at the other longitudinal edge of panel 4 in a mirror image thereof. Said operating mechanisms are disposed in guide rails 5, which are mounted in frame 3 or integrated therein, and which extend on either side of the roof opening 2 and rearwards thereof under fixed roof 1. Each operating mechanism is actuated by a driving slide 6, which is guided in the associated guide rail 5 and which can be moved along guide rail 5 by means of a pull-push cable (not shown) or other connecting element as is well known in the art. The connecting element is connected to a drive unit such as an electric motor, a crank handle or the like.

As is also clearly shown in FIG. 5, a vertically adjustable member in the form of an arm 7 is attached to the driving slide 6 by means of a horizontal, transversely extending pivot a. The arm 7 of driving slide 6 includes a first guide member 9 in the form of a double guide cam, which is in engagement with a guideway 10 in the form of a rib projecting in a transverse direction, which is formed on a link plate 11. The link plate 11 is mounted on the underside of panel 4 and extends in the longitudinal direction thereof.

Figure 7:
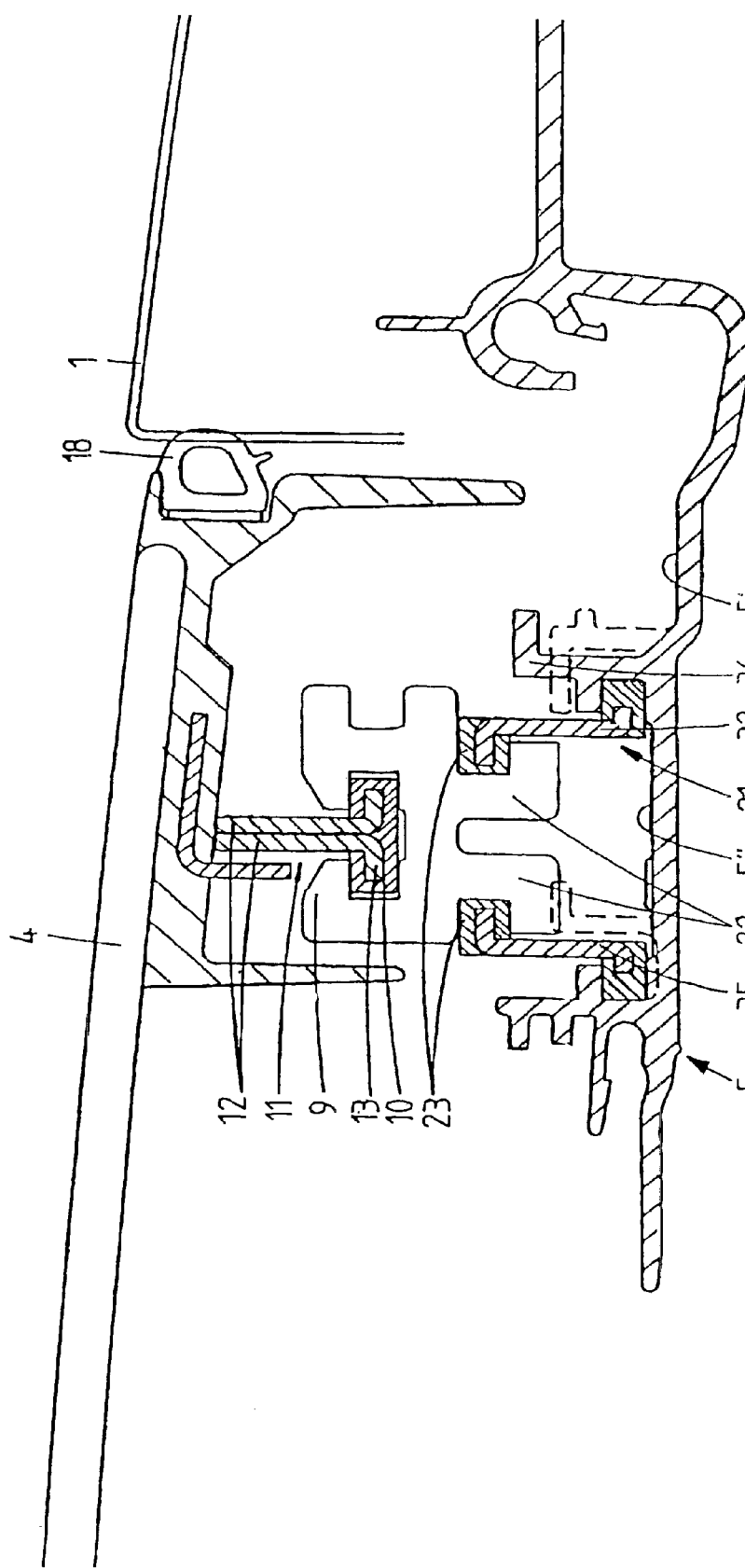
FIG. 7 is a larger-scale cross-sectional view along the line VII—VII in FIG. 2.

As is shown in FIGS. 5 and 7, link plate 11 is formed of two abutting metal plates 12 or the like, which are substantially each other's mirror image and on each of which various parts of the operating mechanism are formed in mirror image of each other (apart from a single cam 19 discussed below). This mirror image construction also applies to guideway 10, which is formed on either side of link plate 11, for example, by molding plastic material on laterally projecting flanges 13 of the metal plates 12 (see FIG. 7).

On the front side, the metal plates 12 of the link plate 11 widely diverge, forming legs 14, on the lower ends of which sliding shoes 15 can be molded. The sliding shoes 15 are accommodated in associated grooves 16 of the guide rail 5 and which are formed such that they are not only capable of sliding movement but also allow rotation about a transverse axis, so that the sliding shoes 15 serve as pivots at the same time. This leads to a reduction of the number of parts present in the operating mechanism in one embodiment.

Disposed some distance behind the front sliding shoes 15 or the front pivot 15 of panel 4 is a correction mechanism 17, which [ca]uses panel 4 to move slightly rearwards upon pivoting from the closed position which is shown in FIG. 2 to the ventilating position which is shown in FIG. 1, so as to detach a seal 18 on the front side of panel 4 from the edge of the fixed roof 1. This prevents said seal 18 from being exposed to high shearing forces upon being moved downwards slightly due to the pivoting movement of panel 4. Said correction mechanism 17 comprises a cam or element 19 that is formed on either one of the two metal plates 12 of link plate 11, which cam 19 is in engagement with either one of camways or counter elements 20 that are formed on a link slide 21, which will be explained in more detail yet. The link slide 6 remains stationary during pivoting movement of panel 4 and moves along guide rail 5 when the panel 4 moves in the longitudinal direction of guide rail 5, so that cams 19 (one for each operating mechanism on each side of the panel 4) and camways 20 can remain in constant engagement with each other because cams 19 allow rearward movement of panel 4 in a lowermost position in camways 20.

In the embodiment illustrated, said link slide 21 is made up of two interconnected metal plates 35 and 36 formed by cutting and bending, and it is substantially symmetrical relative to a vertical longitudinal plane through the link slide 21, so that the same link slide 21 can be used on the left-hand side and on the right-hand side of the roof opening 2. Link slide 21 co-operates with the driving slide 6 in various manners. Driving slide 6 and link slide 21 are guided in two separate, adjoining guideways 5' and 5" of guide rail 5, but driving slide 6 is guided along an upright flange 32 between the two guideways 5' and 5", and projects laterally into guideway 5". Besides first guide member 9, arm 7 of driving slide 6, which extends above guideway 5", also has a second guide member 22, likewise in the form of dual cams engaging round a second guideway 23 on link slide 21. Dual second guide members 22 and second guideways 23 are used again, wherein the guideways 23 are facing ribs between which the two twin cams of the second guide member 22 are positioned (see FIG. 7). The guideways 10 and 23 are substantially the same length, while they are furthermore disposed at least substantially above each other and exhibit approximately the same slope, albeit in opposite direction. The guideways 10 and 23 are so formed and positioned that they can at least partially overlap upon pivoting movement of link plate 11 under the influence of the movement of the first and the second guide member 9, 22 of arm 7 along guideway 10. The sliding block of the arm 7 in which the guide members 9 and 22 are formed is capable of transmitting forces being exerted on panel 4 directly to the link slide 21, as a result of which arm 7 is hardly loaded, if at all, and a very stable support of the panel can be ensured. This effect is further enhanced by the dual construction of guide members 9, 22 and guideways 10, 23.

As already mentioned before, link plate 21 only moves so as to enable movement of panel 4 in a longitudinal direction, it must remain stationary during the other movements of panel 4 in a vertical direction, and consequently driving slide 6 must move relative to link slide 21 in that case. When panel 4 moves in the longitudinal direction, driving slide 6 and link slide 21 move as one unit.

Special-locking, coupling and operating means are provided for locking and releasing link slide 21. As is shown in the various figures, a locking and coupling member 24 is present on link slide 21. Said member 24 comprises a locking cam 25, which is formed on the rear end of an arm 26 The arm 26 is pivotally connected to link slide 21 by means of a horizontal transverse pivot. In the frontmost position of link slide 21 (and of panel 4), the locking cam 25 can come into engagement with a locking recess 28 in a horizontal flange 29 of guide rail 5. The locking and coupling member 24 can be directly actuated by driving slide 6, whereby link slide 21 and guide rail 5 can be interlocked or be released from each other whilst driving slide 6 and link slide 21 can be released from each other or be interlocked, respectively, simultaneously therewith. To this end an operating pin or cam 30 extending towards link slide 21 and projecting above guideway 5" is formed on driving slide 6, which can come into engagement with an operating and coupling slot 31 on locking and coupling member 24 at the location of the locking cam 25 on the free end of arm 26. Pin 30 slides over the upper side of arm 26 before engaging in slot 31, thus retaining the locking cam 24 in its position in locking recess 28. Slot 31 has an open front end with a horizontal entry portion and a downwardly sloping operating and coupling portion, which causes a locking cam 25 to move in vertical direction when the horizontally moving pin 30 passes through slot 31. When the locking cam 25 has moved out of recess 28 and link slide 21 has moved to the rear, the locking cam 25 will slide onto the horizontal flange 29 of guide rail 5, thus blocking a downward return movement of locking cam 25. This causes pin 30 to be retained in the sloping portion of slot 31 and effects a locking engagement between driving slide 6 and link slide 21. In order to have the transmission of forces between driving slide 6 and link slide 31 take place directly rather than via arm 26 and the transverse pivot, at least in rearward direction, another cam (not shown) may be formed on link slide 21, on which part of the driving slide 6 engages. For a further explanation the reader is referred to Dutch patent application No. 1011863 (EP 002012670.7), the contents of which are incorporated herein by reference in their entirety.

Figure 6:
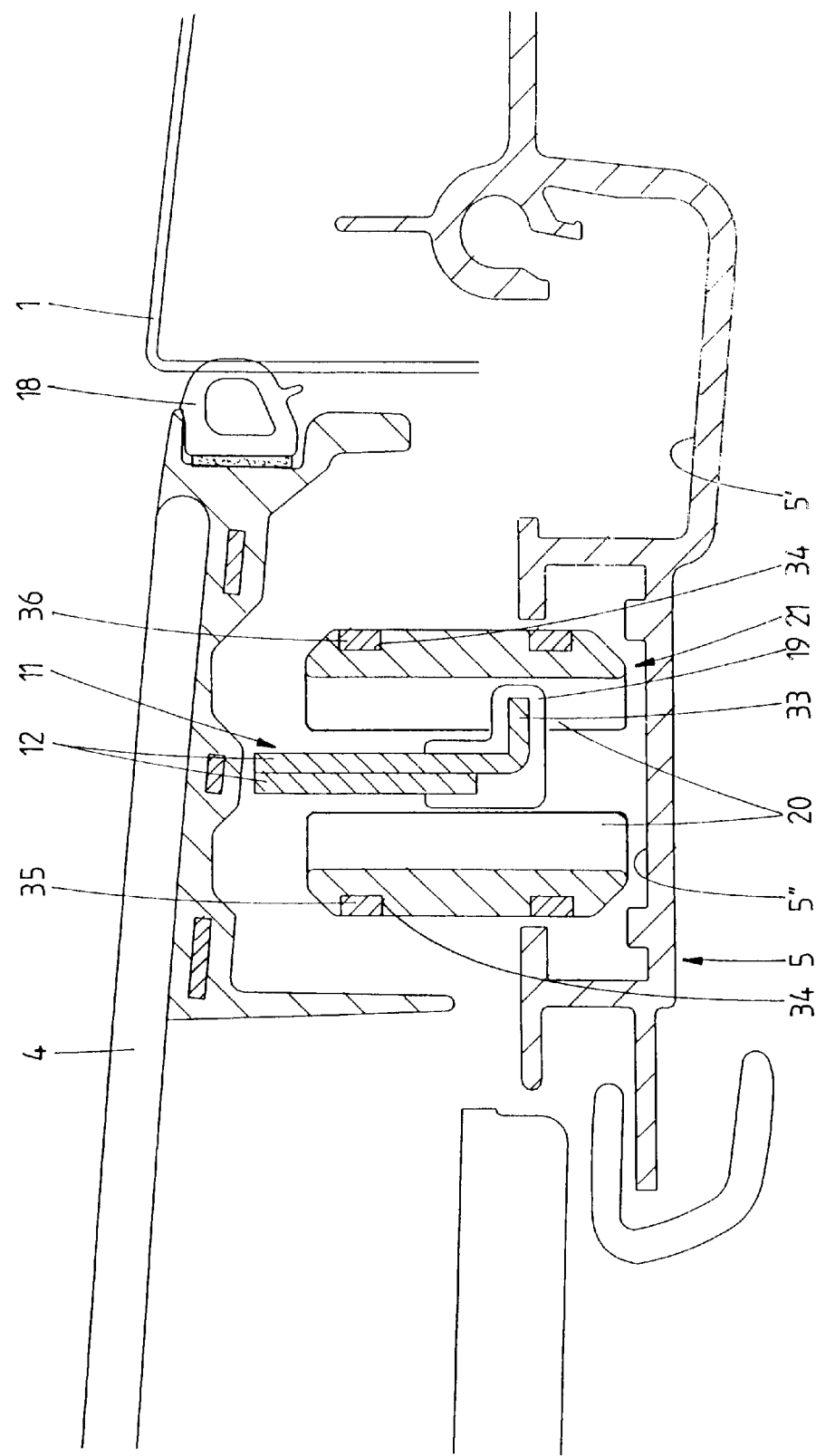
FIG. 6 is a larger-scale cross-sectional view along the line VI—VI in FIG. 2.

Cam 19 and camways 20 can be formed by molding plastic material round metal parts of link plate 11 and link slide 21. A horizontal lip 33 (see FIG. 6) is formed on either one of the two metal plates 12 of link plate 11, which lip functions to support the plastic cam 19, while two vertical lips are cut/bent from each plate of link slide 21 (see opening 34), around which the plastic material for forming camway 30 has been formed by means of an injection molding technique. The camways 20 open toward each other and are substantially aligned with each other. The angle that camways 20 include with the horizontal is large, as a consequence of which a horizontal movement of the metal plate portions 35 and 36 of link slide 21 relative to each other due to production tolerances will result in a misalignment of said camways 20, which have been formed prior to interconnecting the metal plate portions 35 and 36. Since only one cam 19 is used, this does not present any problems. On the other hand, since the two camways 20 are present on link slide 21, it is possible to use the same link slide 21 both on the left and on the right of the panel 4, so that the number of different parts will be reduced. Although illustrated where the single cam or element 19 is formed on the link plate 11 and the camways or counter elements 20 are formed on the slide 21, it should be understood an alternative embodiment of the invention is possible where the camways 20 are formed on the link plate 11 and the single cam 19 is formed on the link slide 21.

The operation of the illustrated embodiment of the open roof construction according to the invention is in principle similar to that of the embodiments described in Dutch patent applications Nos. 1009773 (WO-A-00/06403), 1011863 (EP 00201260.7), 1012645 (EP 00202266.3) and 1012646 (EP 00202268.9) so that the reader is referred to said prior patent applications for a further explanation thereof, and the contents of said patent applications are incorporated herein by reference in their entirety.

From the foregoing it will be understood that the invention provides an open roof construction which on the one hand is remarkable for its simplicity and its small overall height and which on the other hand provides a stable support, while the correction mechanism is of solid and stable construction and insensitive to production tolerances, while it does not add to the number of different parts.

The invention is not restricted to the above-described embodiment as shown in the drawing, which can be varied in several ways without departing from the scope of the invention. Thus the invention can also be used with other kinds of open roof constructions such as tilt roofs, spoiler roofs and other types of roofs comprising panels or different single or multiple closure elements. The vertically adjustable part of the driving slide could also be in engagement via one guide pin or similar guide member with the guideways in the form of guide slots of the closure element and the stationary part. The guide members and guideways as well as the cam and the camways of the correction mechanism could also be kinematically reversed as discussed above. The cam and the camways may also be of different construction, for example being formed with a pin and a slot or with a link rib and cams engaging therearound.

The invention is not restricted to the above-described embodiment as shown in the drawing, which can be varied in several ways without departing from the scope of the invention.

What is claimed is:

1. An open roof construction for a vehicle having an opening in its fixed roof, the open roof construction comprising:
    a stationary part to be fixed to the roof comprising at least one guide rail extending in a longitudinal direction of the vehicle;
    an adjustable closure element supported by said stationary part, which is adjustable between a closed position, in which it closes the roof opening, and an open position, in which it releases the roof opening on the front side, wherein the closure element includes a pivot member near a front side thereof and is slidably supported by at least one sliding shoe which is capable of movement in said guide rail; and
    an operating mechanism adapted for effecting the pivoting movement of the closure element and movement of the closure element in the longitudinal direction of the guide rail, said operating mechanism including a member which is at least substantially stationary during the pivoting movement of the closure element and which moves along with sliding movement of the closure element, the operating mechanism including a correction mechanism disposed some distance behind said pivot member, which functions to move the closure element slightly in the longitudinal direction of the guide rail upon pivoting movement of said closure element about the pivot member, the correction mechanism including an assembly comprising an element and a counter element, wherein either one of said element and said counter element is connected to said closure element and the other is formed on said member of the operating mechanism, and wherein only one of said element and said counter element of the operating mechanism on the member and the closure element are twin parts, being substantially symmetrical with respect to a longitudinal plane, the other being a single element.

2. An open roof construction according to claim 1, wherein said element comprises a cam and said counter elements each comprise a camway.

3. An open roof construction according to claim 2, wherein said cam is formed on said closure element and said camways are formed on the member, the member comprising a link slide.

4. An open roof construction according to claim 3, wherein said link slide is divided in a longitudinal direction, being made of two interconnected halves.

5. An open roof construction according to claim 2, wherein said closure element is a panel of a sliding-tilt roof, which can on the one hand be pivoted from the closed position to a ventilating position and which can on the other hand be moved downwards and rearwards to a position under the fixed roof.

6. An open roof construction according to claim 5, wherein said operating mechanism comprises a driving slide, which is engagement via a vertically adjustable element with a guideway on said panel and with a guideway on the member comprising a link slide that is guided in said guide rail, which link slide includes a locking member, which locks the link slide in position with respect to the guide rail during pivoting movements of the panel and which can be released by the driving slide at the transition to longitudinal movements of the panel, and wherein the camway of the correction mechanism is formed on said link slide.

7. An open roof construction according to claim 2, wherein the camways of the assembly are positioned in opposite sense in a transverse direction on either side of a link plate on the closure element.

8. An open roof construction for a vehicle having an opening in its fixed roof, the open roof construction comprising:
    a stationary part to be fixed to the roof comprising at least one guide rail extending in a longitudinal direction of the vehicle;
    an adjustable closure element selectively closing the roof opening, the closure element including a link having a pivot member allowing pivoting motion of the closure element to a ventilation position and slidable in the guide rail for positioning the closure element at least partially under the fixed roof;
    an operating mechanism adapted for effecting the pivoting movement of the closure element and movement of the closure element in the longitudinal direction of the guide rail, said operating mechanism including a slide slidable in the guide rail and coupled to the link via a correction mechanism for causing longitudinal displacement of the closure element during pivoting movement thereof, the correction mechanism comprising a cam and camway connection formed between the link and the slide, wherein only a single cam is formed on one of the link and the slide and the camway receiving the cam is formed on the other, the operating mechanism further including a second camway substantially aligned with an opening to the first-mentioned camway but not receiving a corresponding cam.

9. An open roof construction according to claim 8, wherein said cam is formed on said link and said camways are formed on the slide.

* * * * *

UNITED STATES PATENT AND TRADEMARK OFFICE
CERTIFICATE OF CORRECTION

| | | |
|---|---|---|
| PATENT NO. | : 6,419,310 B1 | |
| APPLICATION NO. | : 09/661231 | |
| DATED | : July 16, 2002 | |
| INVENTOR(S) | : Manders | |

It is certified that error appears in the above-identified patent and that said Letters Patent is hereby corrected as shown below:

Title page,
Item [56] delete "6,164,128 A" and insert --6,164,178 A--

Signed and Sealed this
Twenty-eighth Day of February, 2012

David J. Kappos
*Director of the United States Patent and Trademark Office*